Patented Feb. 10, 1931

1,792,102

UNITED STATES PATENT OFFICE

WALTER E. LAWSON, OF WILMINGTON, DELAWARE, ASSIGNOR TO E. I. DU PONT DE NEMOURS & COMPANY, OF WILMINGTON, DELAWARE, A CORPORATION OF DELAWARE

COATING COMPOSITION CONTAINING META STYRENE COMBINED WITH SOFTENERS

No Drawing.   Application filed May 14, 1928. Serial No. 277,790.

This invention relates to coating compositions and more particularly to a surface finish containing meta styrene.

The use of meta styrene as a varnish when dissolved in volatile solvents, such as xylene, has been mentioned in British Patent 16,277 (1911) but, so far as I know, no meta styrene composition has been produced which is sufficiently tough and pliable for use as a surface finish.

An object of this invention is to provide a meta styrene coating composition which will adhere to glass, metals, wood, etc.. A further object is to produce such a composition which will be sufficiently tough and pliable as to be suitable for use as a surface finish. Other objects will evidence themselves in the following specification.

These objects are accomplished by the following invention of a coating composition containing meta styrene and suitable softeners.

I have discovered that certain softeners or plasticizers may be incorporated in meta styrene solutions with the result that tough, pliable films are produced which are suitable for use as finishes.

By way of example, I may mix 34 parts by weight of meta styrene with 8.5 parts of lindol (tricresyl phosphate), 20 parts of butylacetate, 10 parts of diethyl carbonate, 40 parts of toluene and 30 parts of xylene. This solution is suitable for use as a brushing lacquer. The following example of a spraying lacquer illustrates a preferred embodiment of my invention:—

|  | Parts by weight |
|---|---|
| Meta styrene | 17.8 |
| Dibutyl phthalate | 4.45 |
| Ethyl acetate | 20 |
| Butyl acetate | 30 |
| Toluene | 30 |
| Xylene | 20 |

In place of dibutyl phthalate or lindol, as set forth in the above example, I may substitute as softeners or plasticizers dixylyl ethane, glyceryl dibenzyl ether or butyl stearate. Homologues of these compounds, such as diamyl phthalate as compared with dibutyl phthalate, may also be used.

It will be understood that the term meta styrene includes its derivatives, such as methyl or ethyl styrene, chlorostyrene, etc. The film forming ingredients may vary depending upon the type of composition desired. Thus meta styrene may be combined with polymers of styrene derivatives or with other compatible film forming ingredients, particularly with compatible polymers of vinyl compounds.

Suitable pigments may be used when it is desired to prepare pigmented enamels or compositions of a like nature.

Compositions made in accordance with my invention are useful as protective finishes for wood, steel, glass, brass, etc., and may be used either on the bare surface or over suitable undercoats.

Whereas meta styrene without suitable softeners gives films which are too brittle for use as surface finishes without modification, when suitable softeners are incorporated as herein described, the films are tough and pliable and may be satisfactorily used as surface finishes.

By the terms "softener", "softeners", or "plasticizers", as used herein, I mean a material or materials which is or are non-volatile at ordinary temperatures and which may be incorporated into the composition in a sufficient quantity to prevent or materially retard checking and cracking without evidence of incompatibility as shown by the deposition of cloudy films.

As many apparently widely different embodiments of this invention may be made without departing from the spirit and scope thereof, it is to be understood that I do not limit myself to these specific embodiments thereof except as defined in the appended claims.

I claim:

1. A coating composition containing meta styrene and dibutyl phthalate.

2. A coating composition comprising meta styrene, dibutyl phthalate and a solvent.

3. A coating composition comprising meta styrene, dibutyl phthalate, ethyl acetate, butyl acetate, toluene and xylene.

4. A composition containing meta styrene and one of a group of substances consisting of tricresyl phosphate, dibutyl phthalate, dixylyl ethane, glyceryl dibenzyl ether, butyl stearate, and the homologues of these compounds.

In testimony whereof, I affix my signature.

WALTER E. LAWSON.